United States Patent [19]

Burkhardt

[11] 4,053,494
[45] Oct. 11, 1977

[54] PREPARATION OF ORGANOPOLYSILOXANES

[75] Inventor: Jürgen Burkhardt, Halsbach, Germany

[73] Assignee: Wacker-Chemie GmbH, Munich, Germany

[21] Appl. No.: 714,740

[22] Filed: Aug. 16, 1976

[30] Foreign Application Priority Data

Sept. 1, 1975   Germany ............................ 2538818

[51] Int. Cl.$^2$ .............................................. C07F 7/08
[52] U.S. Cl. ............................................. 260/448.2 E
[58] Field of Search ................................. 260/448.2 E

[56] References Cited

U.S. PATENT DOCUMENTS

| 3,186,967 | 6/1965 | Nitzsche et al. ............. 260/448.2 E |
| 3,398,176 | 8/1968 | Nitzsche et al. ............. 260/448.2 E |

*Primary Examiner*—Paul F. Shaver

[57] ABSTRACT

A process for preparing organopolysiloxanes by the condensation and/or equilibration of an organosilicon compound containing silicon-bonded oxygen atoms in the presence of a phosphoronitrile chloride and an aryl compound having one or two hydroxy groups linked to the aryl radical.

16 Claims, No Drawings

PREPARATION OF ORGANOPOLYSILOXANES

The present invention relates to a process for the preparation of organopolysiloxanes by the condensation and/or equilibration of organosilicon compounds containing silicon-bonded oxygen atoms.

The condensation of an organosilicon compound containing silicon-bonded oxygen atoms may involve, for example, the reaction of a silicon-bonded hydroxy group with a second silicon-bonded hydroxy group with the elimination of water, or the reaction of a silicon-bonded hydroxy group with a silicon-bonded alkoxy group with the elimination of an alkanol, or the reaction of a silicon-bonded hydroxy group with a silicon-bonded halogen atom with the elimination of a hydrogen halide. The equilibration of an organosilicon compound containing silicon-bonded oxygen atoms for example, an organopolysiloxane, may involve the rearrangement of siloxane bonds in a tendency to reach an equilibrium in the arrangement of the siloxane units.

Condensation and equilibration reactions of this type have been catalyzed by various phosphorus-nitrogen compounds, especially by phosphoronitrile chlorides, such as described in, for example, U.S. Pat. Nos. 2 830 967, 2 990 419, 3 186 967, 3 398 176, 3 652 711, 3 706 775, and 3 839 388, Canadian Pat. No. 809 229 and British Pat. No. 1 049 188. However, none of the patents describe a process for preparing aryloxy containing organopolysiloxanes in the presence of phosphoronitrile chlorides.

Therefore it is an object of this invention to prepare organopolysiloxanes having silicon-bonded aryloxy groups bonded thereto. Another object of this invention is to provide a process for preparing organopolysiloxanes containing silicon-bonded aryloxy groups. A further object of this invention is to provide organopolysiloxanes which have improved resistance to oxidation.

The foregoing objects and others which will become apparent from the following description are accomplished in accordance with this invention, generally speaking, by providing a process for preparing an organopolysiloxane by condensing and/or equilibrating an organosilicon compound containing silicon-bonded oxygen atoms, in the presence of a phosphoronitrile chloride and a hydroxyaryl compound in which one or two hydroxy groups are bonded to an aryl radical.

Organopolysiloxanes prepared in accordance with the present process contain silicon-bonded aryloxy radicals derived from the hydroxyaryl compound. They generally have an improved resistance to oxidation as compared with organopolysiloxanes prepared using phosphoronitrile chlorides in accordance with the processes described in the above-mentioned patents. They may also be prepared easier than the aryl-containing organopolysiloxanes having an improved oxidation resistance such as described in British Patent No. 1 064 021. It was surprising to find that, in the present process, the hydroxyaryl compound does not react with the phosphoronitrile chloride and thus adversely affect its catalytic action.

Organosilicon compounds that may be used in the present process are those which may be catalyzed by phosphoronitrile chlorides in accordance with the known processes. The organosilicon compound may be represented by the general formula HO—(SiR$_2$O)$_m$-H in which R represents an unsubstituted or substituted monovalent hydrocarbon radical and m represents a positive integer up to about 1000. Other organosilicon compounds which may be used in admixture with the organosilicon compound above are those represented by the formula R$_3$Si—(OSiR$_2$)$_m$-R in which R and m are the same as above The organosilicon compounds represented above may contain up to 5 mole percent of siloxane units other than diorganosiloxane units. Such other units are, for example, RSiO$_{3/2}$ and SiO$_{4/2}$ units. Generally, these other units are present only as impurities and their presence often cannot be avoided or can be avoided only with great difficulty.

Examples of unsubstituted monovalent hydrocarbon radicals represented by R are, alkyl radicals, e.g. methyl, ethyl, n-propyl, isopropyl, n-butyl and sec-butyl radicals; alkenyl radicals, e.g. vinyl and allyl radicals; aryl radicals, e.g. phenyl radicals; alkaryl radicals, e.g. (o, m or p)-tolyl radicals; and aralkyl radicals, e.g. benzyl radicals, Suitable examples of substituted monovalent hydrocarbon radicals represented by R are, for example, cyanoalkyl radicals, e.g. β-cyanoethyl radicals; halogenoalkyl radicals, e.g. 3,3,3-trifluoropropyl radicals; and halogenoaryl radicals, e.g. (o, m, or p)-chlorophenyl radicals. It is preferred that at least 50 mole percent of the radicals represented by R be methyl radicals, since they are readily available and the remaining radicals represented by R are, preferably, vinyl or phenyl radicals.

The phosphoronitrile chloride used in the preparation of organopolysiloxanes may be prepared by reacting phosphorus pentachloride with ammonium chloride in a weight ratio of 4:1.3 (cf. *Berichte der deutschen Chemischen Gesellschaft*, Vol 57 (1924) p. 1345). An alternative, and preferred, method for its preparation is by the reacting phosphorus pentachloride and ammonium chloride in a molar ratio of about 2:1 (cf. U.S. Pat. No. 3 839 388).

The term "phosphoronitrile chloride" as used herein includes phosphoronitrile chloride, of the formula PNCl$_2$ as well as phosphoronitrile chlorides having for example the formula Cl$_3$PNPCl$_2$NPCl$_3$. PCl$_6$ such as is described in U.S. Pat. No. 3 839 388.

The phosphoronitrile chloride may be used in an amount of from 0.001 to 0.1 percent by weight and more preferably from 0.003 to 0.05 percent by weight, based on the weight of the organosilicon compound.

In order to facilitate the addition of the phosphoronitrile chloride as well as to improve contact between the phosphoronitrile chloride and the organosilicon compound, the phosphoronitrile chloride is preferably used in the form of a solution in an inert solvent i.e. a solvent which is inert under the reaction conditions. Examples of suitable solvents are, halohydrocarbons which are liquid at room temperature and atmospheric pressure, e.g. tetrachloroethane, chloroform, methylene chloride and mixtures thereof.

The hydroxyaryl compound used in the present process is preferably
a. a phenol of the general formula

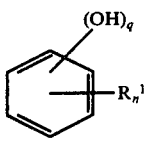

in which q represents 1 or 2, n represents 0 or an integer up to 5, with the provision that n cannot be 5 when q is 2, and $R^1$ represents a methyl radical, a methoxy radical, a tert-butyl radical, a tert-butoxy radical, a 1,1,3,3-tetramethyl butyl radical (—$CMe_2CH_2CMe_3$ in which Me represents methyl); a 1,1,3,3-tetramethylbutoxy radical (—$OCMe_2CH_2CMe_3$), or a radical of the general formula

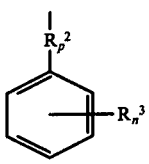

in which p represents 0 or 1, n is the same as above, $R^2$ represents an oxygen atom, a methylene radical, an isopropylene radical or a sulfonyl radical (—$SO_2$–), and $R^3$ represents a methyl radical, a methoxy radical, a tert-butyl radical, a tert-butoxy radical, a 1,1,3,3-tetramethylbutyl radical, or a 1,1,3,3-tetramethylbutoxy radical;

b. a naphthol of the general formula

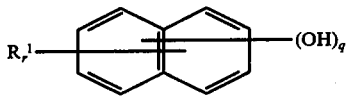

in which q represents 1 or 2 r represents 0 or an integer up to 7, with the provision that r cannot represent 7 when q is 2, and R is the same as above; or c. a bis-phenol of the general formula

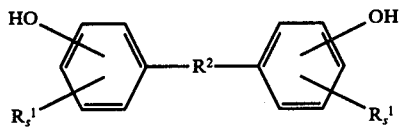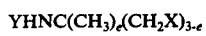

in which s represents 0 or an integer up to 4, and $R^1$ and $R^2$ are the same as above.

Examples of phenols (a) are phenol, 4-tert-butylphenol, 4-phenylphenol, 3-tert-butyl-4-hydroxyanisole, 4-hydroxyanisole, 2-tert-butylphenol, 2,4-di-tert-butylphenol, 2,4-dimethyl-6-tert-butylphenol, 2,6-di-tert-butyl-4-methylphenol, hydroquinone, resorcinol, toluhydroquinone, trimethylhydroquinone, and 2,6-di-tert-butylhydroquinone, Examples of naphthols (b) are alphanaphthol, beta-naphthol, and 1,4-naphthohydroquinone. Examples of bis-phenols (c) are 2,2-bis-(4-hydroxphenyl)-propane, bis-(4-hydroxyphenyl)-sulphone, 2,2'-methylene-bis-(4-methyl-6-tert-butylphenol) and 4,4'-methylene-bis-(2,6-di-tert-butylphenol). Mixtures of two or more hydroxyaryl compounds may be used, for example, a mixture of 7 parts by weight of 4-phenylphenol and 13 parts by weight of 2,2-bis-(4-hydroxyphenyl)-propane.

The hydroxyaryl compound may be used in an amount of from 0.001 to 10 mole percent and more preferably from 0.005 to 5 mole percent, based on the organosilicon compound or siloxane units therein.

In order to facilitate the addition of the hydroxyaryl compound and to improve contact between the reactants, it is prefered that the hydroxyaryl compound be used in the form of a solution in an inert polar solvent. Suitable polar solvents are, for example, ethers, ketones and esters that are liquid at room temperature and atmospheric pressure, e.g. di-tert-butyl ketone, di-tert-butyl ether, diethylene glycol dimethyl ether, and ethyl acetate.

The hydroxyaryl compound need not be present when the condensation and/or equilibration reaction is initiated, but may be added to the reactants mid-way through the reaction, for example, when additional phosphoronitrile chloride is added.

The process according to the invention is preferably carried out at a temperature of from about 0 to 200° C, and more preferably from 100 to 180° C. Preferably it is carried out under atmospheric pressure; however, it may be carried out under a higher or lower pressure. Also, it may be carried out batch-wise or as a semi continuous or as a continuous process. The reactants are preferably agitated during the process in, for example, a planetary mixer, a paddle kneader, a screw kneader, or a twin-screw kneader.

When the process is carried out in accordance with this invention to the desired degree, that is when an organopolysiloxane of the desired viscosity (generally from $10^3$ to $5 \times 10^7$ cP at 25° C) has been obtained, the phosphoronitrile chloride may be deactivated in order to prevent further reaction and thereby stabilize the viscosity of the organopolysiloxane. One method of deactivating the phosphoronitrile chloride is by adding a tertiary amine, for example tributylamine, generally in an amount of from 1 to 1.5 moles per mole of the phosphoronitrile chloride, as described in British Pat. No. 1 070 360. Another method of stabilizing the viscosity of an organopolysiloxane prepared in the presence of a phosphoronitrile chloride, is described in U.S. Patent application Ser. No. 687,064, which method comprises treating the organopolysiloxane with a amine such as ammonia or a compound of the general formula $$YHNC(CH_3)_e(CH_2X)_{3-e}$$

in which each X represents a hydrogen atom or a radical of the formulae —$OCH_3$, —$N(CH_3)_2$, —$C(CH_3)_3$, —$C(CH_3)_2NHY$ and —$OC(CH_3)_3$, each Y represents a hydrogen atom or a trimethylsilyl radical, and e represents 0, 1, 2 or 3, in an amount within the range of from 1 to 5 moles per mole of phosphoronitrile chloride (calculated as $PNCl_2$) employed in the preparation of the organopolysiloxane.

Various types of organopolysiloxanes may be prepared in accordance with the process of this inventiion. For example, organopolysiloxane oils i.e. triorganosiloxy-endblocked diorganopolysiloxanes that are liquid at room temperature which may be used as lubricants and hydraulic fluids, and diorganopolysiloxanes which are curable by means of free radicals, such as by the addition of silicon-bonded hydrogen atoms to aliphatic multiple bonds, or by condensing condensable groups in so-called "one-component systems" and "two-component systems". The organopolysiloxanes prepared in accordance with the present process may be mixed with other organosilicon compounds in order to stabilize such compounds.

The following examples illustrate the process of this invention in which all parts and percentages are by weight unless otherwise specified. All viscosities are measured at 25° C.

The phosphoronitrile chloride used in the examples was prepared in the following manner: A mixture containing 417 grams (2 moles) of phosphorus pentachloride and 53.5 grams (1 mole) of ammonium chloride in 1000 milliliters of tetrachloroethane was refluxed for 12 hours over an oil bath having a temperature of 160° C to give a light yellow solution. The volatile components were then distilled off at 160° C, while lowering the pressure to about 1 torr, to give a residue of yellowish crystals consisting mainly of phosphoronitrile chloride of the formula $Cl_3PNPCl_2NPCl_3 \cdot PCl_6$

EXAMPLE 1

A mixture containing 392 parts of a hydroxy-terminated dimethylpolysiloxane having a viscosity of 140 cSt, 8 parts of 2,2-bis-(4-hydroxyphenyl)-propane and 0.1 milliliter of a 25 percent solution of phosphoronitrile chloride in methylene chloride is kneaded for 1 hour at 100° C and 10 torr. The viscosity of the dimethylpolysiloxane increased to over $10^6$ cP, as a result of the condensation of the Si-bonded hydroxy groups. Kneading was then continued for an additional 12 hours at 160° C and 10 torr, during which time the initially white composition became transparent, as a result of the formation of silicon-aryloxy bonds. During this further kneading process, the viscosity of the dimethylpolysiloxane first dropped to 1000 cP and then increased to $5 \times 10^6$ cP. at 25° C. About 0.2 milliliters of tert-octylamine was then kneaded, at 140° C and at approximately 760 torr, into the highly viscous diorganopolysiloxane thus obtained ($n_D^{25} = 1.410$). Approximately 1 percent of the highly viscous diorganopolysiloxane thus obtained was then kneaded into 100 parts of a trimethylsiloxy-terminated dimethylpolysiloxane having a plasticity of 540 mkp. This mixture did not gel after 4 days at 200° C., whereas in the absence of the diorganopolysiloxane containing silicon bonded aryloxy groups, the same trimethylsiloxy-terminated dimethylpolysiloxane gelled.

EXAMPLE 2

About 80 liters/hour of a hydroxy-terminated dimethylpolysiloxane having a viscosity of 110 cSt, 3.3 liters/hour of a trimethylsiloxyterminated dimethylpolysiloxane having a viscosity of 100 cSt, about 64 milliliters /hour of a 25 percent solution of 4-phenylphenol in diethylene glycol dimethyl ether and 80 milliliters/hour of a 1 percent solution of phosphoronitrile chloride in methylene chloride were continuously fed into a twin-screw kneader with a 3.5 meter long reaction zone, operated at 150° C and at 3 torr. A dimethylpolysiloxane terminated predominantly by trimethylsiloxy groups and having a viscosity of 131,500 cP was produced and passed, via a discharge screw and discharge pipe, and while still at a temperature of almost 150° C, into a geared pump, where it was mixed with 80 milliliters/hour of a 4 percent solution of tert-octylamine. A sample of the dimethylpolysiloxane thus obtained did not gel after 108 days at 200° C.

EXAMPLE 3

The procedure described in Example 2 was repeated, except that 64 milliliters/hour of a 25 percent solution of 2,4-di-tert-butylphenol in diethylene glycol dimethyl ether were substituted for the solution of 4-phenylphenol and introduced into the twinscrew kneader. The dimethylpolysiloxane obtained, was terminated predominantly with trimethylsiloxy groups and had a viscosity of 139,750 cP. A sample of the dimethylpolysiloxane obtained gelled after 60 days at 200° C.

EXAMPLE 4 (Comparison)

The procedure described in Example 2 was repeated, except that the 4-phenylphenol solution was omitted. The dimethylpolysiloxane obtained was terminated almost completely by trimethylsiloxy groups and had a viscosity of 166,000 cP. It gelled after 16 days at 200° C.

EXAMPLE 5

A mixture containing 400 parts of a hydroxy-terminated dimethylpolysiloxane having a viscosity of 90 cSt and 0.05 milliliter of a 25 percent solution of phosphoronitrile chloride in methylene chloride was kneaded for 30 minutes at 80° C and at 10 torr. The viscosity of the dimethylpolysiloxane increased to over $10^6$ cP. About 7 parts of 4-phenylphenol, 13 parts of 2,2-bis-(4-hydroxyphenyl)-propane, and an additional 0.05 milliliter of the phosphoronitrile chloride solution were added to the highly viscous dimethylpolysiloxane obtained and the mixture was kneaded for 1 hour at 180° C. and at 10 torr. The viscosity fell to 470 cP. About 0.2 milliliter of tris-2-ethylhexylamine was then mixed into the dimethylpolysiloxane thus obtained.

Although specific examples of the invention have been described herein, other variations and modifications falling within the spirit and scope of the appended claims are to be included therein.

What we claim is:

1. A process for preparing an organopolysiloxane, which comprises polymerizing an organosilicon compound having the general formula $HO-(SiR_2O)_m-H$ in which R is selected from the class consisting of an unsubstituted monovalent hydrocarbon radical and a substituted monovalent hydrocarbon radical and m represents a positive integer up to 1000, in the presence of a phosphoronitrile chloride and a hydroxyaryl compound in which one or two hydroxy groups are bonded to an aryl radical.

2. The process of claim 1, wherein an organosilicon compound is also present having the general formula $R_3Si-(OSiR_2)_m-R$ in which R is selected from the class consisting of an unsubstituted monovalent hydrocarbon radical and a substituted monovalent hydrocarbon radical and m represents a positive integer up to 1000.

3. The process of claim 1 wherein at least 50 mole percent of the radicals represented by R in the organosilicon compound are methyl radicals and any remaining radicals represented by R are vinyl or phenyl radicals.

4. The process of claim 1 wherein the phosphoronitrile chloride was obtained from the reaction of phosphorus pentachloride and ammonium chloride in a molar ratio of about 2:1.

5. The process of claim 1, wherein the phosphoronitrile chloride is represented by the formula Cl₃PNPCl₂NPCl₃ . PCl₆

6. The process of claim 1, wherein the phosphoronitrile chloride is present in an amount of from 0.001 to 0.1 percent by weight, based on the weight of the organosilicon compound.

7. The process of claim 1 wherein the phosphoronitrile chloride is dissolved in an inert solvent.

8. The process of claim 1 wherein the hydroxyaryl compound is selected from the class consisting of (a) a phenol of the general formula

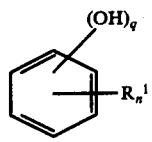

in which $q$ represents 1 or 2, $n$ represents 0 or an integer of up to 5, with the provision that $n$ cannot be 5 when $q$ is 2, and $R^1$ represents a radical selected from the group consisting of a methyl radical, a methoxy radical, a tert-butyl radical, a tert-butoxy radical, a 1,1,3,3-tetramethylbutyl radical, a 1,1,3,3-tetramethylbutoxy radical and a radical of the general formula

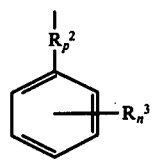

in which $p$ represents 0 or 1, $n$ is the same as above, $R^2$ represents a radical selected from the group consisting of an oxygen atom, a methylene radical, an isopropylene radical and a sulfonyl radical, and $R^3$ represents a radical selected from the class consisting of a methyl radical, a methoxy radical, a tert-butyl radical, a tert-butoxy radical, a 1,1,3,3-tetramethylbutyl radical, and a 1,1,3,3-tetramethylbutoxy radical;

b. a naphthol of the general formula

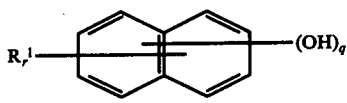

in which $q$ represents 1 or 2, $r$ or represents 0 or an integer up to 7, with the provision that $r$ cannot be 7 when $q$ is 2, and $R^1$ is the same as above; and c. a bis-phenol of the general formula

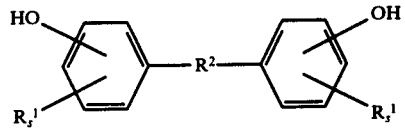

in which $s$ is 0 or an integer up to 4, and $R^1$ and $R^2$ are the same as above.

9. The process of claim 1 wherein the hydroxyaryl compound is selected from the class consisting of a phenol, 4-tertbutylphenol, 4-phenyl-phenol, 3-tert-butyl-4-hydroxyanisole, 4-hydroxyanisole, 2-tert-butyl-phenol, 2,4-di-tert-butylphenol, 2,4-dimethyl-6-tert-butyl-phenol, 2,6-di-tert-butyl-4-methylphenol, catechol, hydroquinone, resorcinol, toluhydroquinone, trimethylhydroquinone, 2,6-di-tert-butylhydroquinone, alpha-naphthol, beta-naphthol, 1,4-naphthohydroquinone, 2,2-bis-(4-hydroxyphenyl)-propane, bis-(4-hydroxyphenyl)-sulphone, 2,2'-methylene-bis-(4-methyl-6-tert-butylphenol) or 4,4'-methylene-bis-(2,6-di-tert-butylphenol).

10. The process of claim 1 wherein the hydroxyaryl compound is present in an amount of from 0.001 to 10 mole percent based on the organosilicon compound or siloxane units therein.

11. The process of claim 1 wherein the hydroxyaryl compound is dissolved in an inert polar solvent.

12. The process of claim 1 wherein it is carried out at a temperature of from 0 to 200° C.

13. The process of claim 1 wherein the resultant organopolysiloxane has a viscosity of from $10^3$ to $5 \times 10^7$ cP at 25° C.

14. The process of claim 1 wherein an amine is added to terminate the polymerization.

15. The process of claim 14 where the amine is a tertiary amine, and said amine is present in an amount of from 1 to 1.5 moles per mole of the phosphoronitrile chloride.

16. The process of claim 14 wherein the amine is ammonia or a compound of the formula

YHNC(CH₃)ₑ(CH₂X)₃₋ₑ in which each X is selected from the class consisting of a radical of the formula —OCH₃'—N(CH₃)₂'ₓ —C(CH₃)₃'—C(CH₃)₂NHY and —OC(CH₃)₃ and a hydrogen atom, each Y denotes a hydrogen atom or a trimethylsilyl radical, $e$ represents 0, 1, 2 or 3, said amine is present in an amount of from 1 to 5 moles per mole of phosphoronitrile chloride based on PNCl₂.

* * * * *